(12) United States Patent
Okamoto et al.

(10) Patent No.: US 10,841,006 B2
(45) Date of Patent: Nov. 17, 2020

(54) SIGNAL-TO-NOISE RATIO ESTIMATION METHOD, OPTICAL TRANSMISSION APPARATUS, AND OPTICAL TRANSMISSION SYSTEM

(71) Applicant: NIPPON TELEGRAPH AND TELEPHONE CORPORATION, Tokyo (JP)

(72) Inventors: Seiji Okamoto, Yokosuka (JP); Yoshiaki Kisaka, Yokosuka (JP); Kengo Horikoshi, Yokosuka (JP); Mitsuteru Yoshida, Yokosuka (JP); Masahiro Suzuki, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/497,464

(22) PCT Filed: Mar. 26, 2018

(86) PCT No.: PCT/JP2018/012024
§ 371 (c)(1),
(2) Date: Sep. 25, 2019

(87) PCT Pub. No.: WO2018/181122
PCT Pub. Date: Oct. 4, 2018

(65) Prior Publication Data
US 2020/0028586 A1  Jan. 23, 2020

(30) Foreign Application Priority Data
Mar. 31, 2017 (JP) ................................ 2017-072450

(51) Int. Cl.
*H04B 10/079* (2013.01)
*H04J 14/06* (2006.01)
(Continued)

(52) U.S. Cl.
CPC ........ *H04B 10/07953* (2013.01); *H04J 14/06* (2013.01); *H04B 10/07* (2013.01);
(Continued)

(58) Field of Classification Search
None
See application file for complete search history.

(56) References Cited

U.S. PATENT DOCUMENTS

2014/0126328 A1* 5/2014 Hirabayashi ........... G01V 1/288
367/73
2016/0013863 A1  1/2016 Dou et al.

FOREIGN PATENT DOCUMENTS

JP  2007295257 A  11/2007
JP  2014168223 A   9/2014
JP  2016019289 A   2/2016

OTHER PUBLICATIONS

J. H. Lee et al., "A Review of the Polarization-Nulling Technique for Monitoring Optical-Signal-to-Noise Ratio in Dynamic WDM Networks", Journal of Lightwave Technology, vol. 24, No. 11, Nov. 2006, pp. 4162-4171.
(Continued)

*Primary Examiner* — Darren E Wolf
(74) *Attorney, Agent, or Firm* — Harness, Dickey & Pierce, P.L.C.

(57) ABSTRACT

A signal-to-noise ratio (SNR) estimation method includes an optical signal transmission step of inserting at least one pair of signal sequences into transmission data and transmitting the transmission data into which the at least one pair of signal sequences is inserted, a signal sequence extraction step of extracting the at least one pair of signal sequences from a received signal obtained by receiving the transmitted transmission data, an inner product calculation step of calculating an inner product value of the extracted at least one pair of signal sequences, a reception power calculation
(Continued)

step of calculating reception power of the extracted at least one pair of signal sequences, and an SNR calculation step of calculating an SNR of the at least one pair of signal sequences on the basis of the calculated inner product value and the calculated reception power.

10 Claims, 9 Drawing Sheets

(51) Int. Cl.
    *H04B 10/50*     (2013.01)
    *H04B 10/07*     (2013.01)
    *H04B 17/00*     (2015.01)
    *H04B 10/63*     (2013.01)
    *H04B 10/40*     (2013.01)
    *H04B 10/43*     (2013.01)
    *H04B 10/60*     (2013.01)

(52) U.S. Cl.
    CPC ........ *H04B 10/079* (2013.01); *H04B 10/0795* (2013.01); *H04B 10/07955* (2013.01); *H04B 10/40* (2013.01); *H04B 10/43* (2013.01); *H04B 10/50* (2013.01); *H04B 10/60* (2013.01); *H04B 17/00* (2013.01)

(56) References Cited

OTHER PUBLICATIONS

International Search Report (in English and Japanese) issued in International Application No. PCT/JP2018/012024, dated May 22, 2018; ISA/JP.

* cited by examiner

SIGNAL-TO-NOISE RATIO ESTIMATION METHOD, OPTICAL TRANSMISSION APPARATUS, AND OPTICAL TRANSMISSION SYSTEM

CROSS-REFERENCE TO RELATED APPLICATIONS

This application is a 371 U.S. National Phase of International Application No. PCT/JP2018/012024, filed on Mar. 26, 2018, which claims priority to Japanese Application No. 2017-072450, filed on Mar. 31, 2017. The entire disclosures of the above applications are incorporated herein by reference.

TECHNICAL FIELD

The present invention relates to optical transmission technology.

BACKGROUND ART

Digital coherent technology has made it possible a transmission of multi-leveled signals in an optical transmission system regarded to be difficult hitherto and has increased transmission capacity dramatically. Optical transmission systems having the capability to use various signal formats such as binary phase shift keying (BPSK), quadrature phase shift keying (QPSK), 8 quadrature amplitude modulation (8-QAM), and 16 quadrature amplitude modulation (16-QAM) have been generalized, and users can have more options in choosing a signal format. The transmission capacity increases in an optical transmission system as the number of multi-levels of a signal increases. However, a transmittable distance of the system shortens as the number of multi-levels of a signal increases. Thus, the user needs to select an appropriate modulation format in accordance with a state of a transmission path.

In general, the state of the transmission path can be ascertained by measuring a signal to noise ratio (SNR) which is a ratio of noise power generated in the transmission path to signal power. Thus, it is possible to select an applicable modulation format in the transmission path on the basis of the measured SNR. In general, it is possible to obtain the SNR by measuring a noise component and a signal component in a frequency domain at a reception end using a spectrum analyzer. However, it is inefficient to measure the SNR with the spectrum analyzer for an open test of each transmission path. Thus, it is desirable to automatically measure the SNR between systems connected to the transmission path without using a measurement device such as a spectrum analyzer.

In general, schemes of estimating an SNR without using a measurement device between systems connected to a transmission path are classified into two schemes. The first scheme is a polarization-nulling scheme using one of two orthogonal polarized waves as an SNR monitor (see, for example, Non-Patent Document 1). The second scheme is a scheme of monitoring an SNR by inserting a signal of a predetermined pattern into a main signal (see, for example, Patent Document 1). Specifically in the first scheme, the transmission side transmits a signal in one of two orthogonal polarized waves (hereinafter referred to as a "polarized wave S") and transmits a null signal in the other polarized wave. Then, the reception side obtains signal power and noise power and calculates a ratio of the signal power to the noise power to obtain an SNR. To obtain the signal power, the reception side measures maximum power of a signal of the polarized wave S obtained through polarized wave separation by controlling a polarized wave controller. To obtain the noise power, the reception side measures minimum power of a signal obtained through polarized wave separation by controlling the polarized wave controller. In the second scheme, the transmission side inserts a predetermined pattern signal with periodicity into a main signal and transmits the main signal. The reception side can obtain the SNR on the basis of a power component obtained by performing a Fourier transform with respect to a time when the predetermined pattern signal exists in the main signal received at the reception side.

CITATION LIST

Patent Literature

[Patent Document 1]
Japanese Unexamined Patent Application, First Publication No. 2014-168223

Non-Patent Document

[Non-Patent Document 1]
J. H. Lee, H. Y. Choi, S. K. Shin, and Y. C. Chung, "A Review of the Polarization-Nulling Technique for Monitoring Optical-Signal-to-Noise Ratio in Dynamic WDM Networks", Journal of Lightwave Technology, Vol. 24, No. 11, November 2006, pp. 4162-4171

SUMMARY OF INVENTION

Technical Problem

A conventional optical communication system multiplexes independent transmission signals on two orthogonal polarized waves to perform transmission. When the SNR is obtained using one polarized wave of the two orthogonal polarized waves in transmission of a null signal as in the above-mentioned first scheme, a transmittable amount of information will be halved. When the SNR is obtained by inserting a predetermined pattern signal having periodicity into the main signal as in the above-mentioned second scheme, the transmission efficiency is significantly good because it is possible to detect a pattern signal even when a proportion of the predetermined pattern signal occupied in the main signal is low with a certain degree. However, because it is necessary to insert a signal sequence (for example, an alternating pattern such as 010101 . . . ) as the pattern signal so that a specific frequency component is emphasized, the predetermined pattern signal is biased to the specific frequency component. When a bias toward a specific frequency component occurs in an optical signal including a pattern signal, nonlinear optical effects such as cross phase modulation (XPM) and self-phase modulation (SPM) occur and transmission quality is likely to be degraded.

In view of the above circumstances, an objective of the present invention is to provide technology capable of measuring an SNR while limiting the degradation of transmission quality.

Solution to Problem

According to a first aspect of the present invention, there is provided a signal-to-noise ratio (SNR) estimation method including: an optical signal transmission step of inserting at least one pair of signal sequences into transmission data and transmitting the transmission data into which the at least one pair of signal sequences is inserted; a signal sequence extraction step of extracting the at least one pair of signal sequences from a received signal of the transmission data; an inner product calculation step of calculating an inner product value of the extracted at least one pair of signal sequences; a reception power calculation step of calculating reception power of the extracted at least one pair of signal sequences; and an SNR calculation step of calculating an SNR of the at least one pair of signal sequences on the basis of the calculated inner product value and the calculated reception power.

According to a second aspect of the present invention, in the SNR estimation method of the first aspect, the optical signal transmission step includes: inserting the at least one pair of signal sequences into the transmission data of each of an X-polarized wave and a Y-polarized wave, combining the transmission data of the X-polarized wave into which the at least one pair of signals is inserted and the transmission data of the Y-polarized wave into which the at least one pair of signals is inserted, and transmitting the combined transmission data of the X-polarized wave with the transmission data of the Y-polarized wave. The signal sequence extraction step includes: receiving the combined transmission data of the X-polarized wave with the transmission data of the Y-polarized wave in the optical signal transmission step, and extracting the at least one pair of signal sequences from each of the received signal of the X-polarized wave and the received signal of the Y-polarized wave. The inner product calculation step includes: calculating an inner product value of the at least one pair of signal sequences extracted from the received signal of the X-polarized wave, and calculating an inner product value of the at least one pair of signal sequences extracted from the received signal of the Y-polarized wave. The reception power calculation step includes: calculating reception power of the at least one pair of signal sequences extracted from the received signal of the X-polarized wave, and calculating reception power of the at least one pair of signal sequences extracted from the received signal of the Y-polarized wave. The SNR calculation step includes: calculating the SNR of the at least one pair of signal sequences of the X-polarized wave on the basis of the calculated inner product value and reception power of the X-polarized wave, and calculating the SNR of the at least one pair of signal sequences of the Y-polarized wave on the basis of the calculated inner product value and reception power of the Y-polarized wave.

According to a third aspect of the present invention, the SNR estimation method of the first or second aspect further includes a trimming step of removing a signal of a predetermined length from both ends of each of the at least one pair of signal sequences extracted in the signal sequence extraction step, wherein the inner product calculation step includes calculating the inner product value of the at least one pair of signal sequences from which the signal of the predetermined length has been removed in the trimming step, and wherein the reception power calculation step includes calculating the reception power of the at least one pair of signal sequences from which the signal of the predetermined length has been removed in the trimming step.

According to a fourth aspect of the present invention, the SNR estimation method of the third aspect further includes a filtering step of extracting a signal component of a frequency band that is not affected by a reception band of a coherent reception circuit for receiving the transmission data from the at least one pair of signal sequences from which the signal of the predetermined length has been removed in the trimming step, wherein the inner product calculation step includes calculating the inner product value of signal components of the at least one pair of signal sequences extracted in the filtering step, and wherein the reception power calculation step includes calculating the reception power of the signal components of the at least one pair of signal sequences extracted in the filtering step.

According to a fifth aspect of the present invention, the SNR estimation method of any one of the first to fourth aspects further includes an inner product value averaging step of calculating an average value of inner product values calculated for each at least one pair of signal sequences extracted in the signal sequence extraction step; and a reception power averaging step of calculating an average value of reception power calculated for each at least one pair of signal sequences extracted in the signal sequence extraction step, wherein the SNR calculation step includes calculating the SNR of the at least one pair of signal sequences on the basis of the average value of the inner product values calculated in the inner product value averaging step and the average value of the reception power calculated in the reception power averaging step.

According to a sixth aspect of the present invention, in the SNR estimation method of any one of the first to fifth aspects, the at least one pair of signal sequences include a pair of a pseudo-random signal sequence and one signal sequence of the pseudo-random signal sequence and a signal sequence obtained by inverting signs of signals of the pseudo-random signal sequence.

According to a seventh aspect of the present invention, there is provided an optical transmission apparatus including: a signal sequence extraction unit configured to extract at least one pair of signal sequences from a received signal including transmission data and the at least one pair of signal sequences; an inner product calculation unit configured to calculate an inner product value of the at least one pair of signal sequences extracted by the signal sequence extraction unit; a power calculation unit configured to calculate reception power of the at least one pair of signal sequences extracted by the signal sequence extraction unit; and an SNR calculation unit configured to calculate an SNR of the at least one pair of signal sequences on the basis of the inner product value calculated by the inner product calculation unit and the reception power calculated by the power calculation unit.

According to an eighth aspect of the present invention, there is provided an optical transmission system including: an optical signal transmission unit configured to insert at least one pair of signal sequences into transmission data and transmit the transmission data in which the at least one pair of signal sequences is inserted; a signal sequence extraction unit configured to extract the at least one pair of signal sequences from a received signal of the transmission data; an inner product calculation unit configured to calculate an inner product value of the at least one pair of signal sequences extracted by the signal sequence extraction unit; a power calculation unit configured to calculate reception power of the at least one pair of signal sequences extracted by the signal sequence extraction unit; and an SNR calculation unit configured to calculate an SNR of the at least one pair of signal sequences on the basis of the inner product value calculated by the inner product calculation unit and the reception power calculated by the power calculation unit.

Advantageous Effects of Invention

According to the present invention, it is possible to measure an SNR while limiting the degradation of transmission quality.

DESCRIPTION OF EMBODIMENTS

First Embodiment

An optical transmission system in a first embodiment includes a transmitter configured to transmit an optical signal and a receiver configured to receive the optical signal transmitted from the transmitter. The transmitter includes an optical signal transmission unit configured to convert an input main signal into an optical signal and output the optical signal. The optical signal transmission unit is configured to insert a predetermined pattern signal necessary for the receiver to calculate a signal to noise ratio (SNR) into the main signal. The receiver includes an optical signal reception unit configured to receive the optical signal transmitted from the transmitter and acquire the main signal from the received optical signal. The optical signal reception unit has a configuration for calculating the SNR on the basis of the optical signal received from the transmitter.

Figure 1:
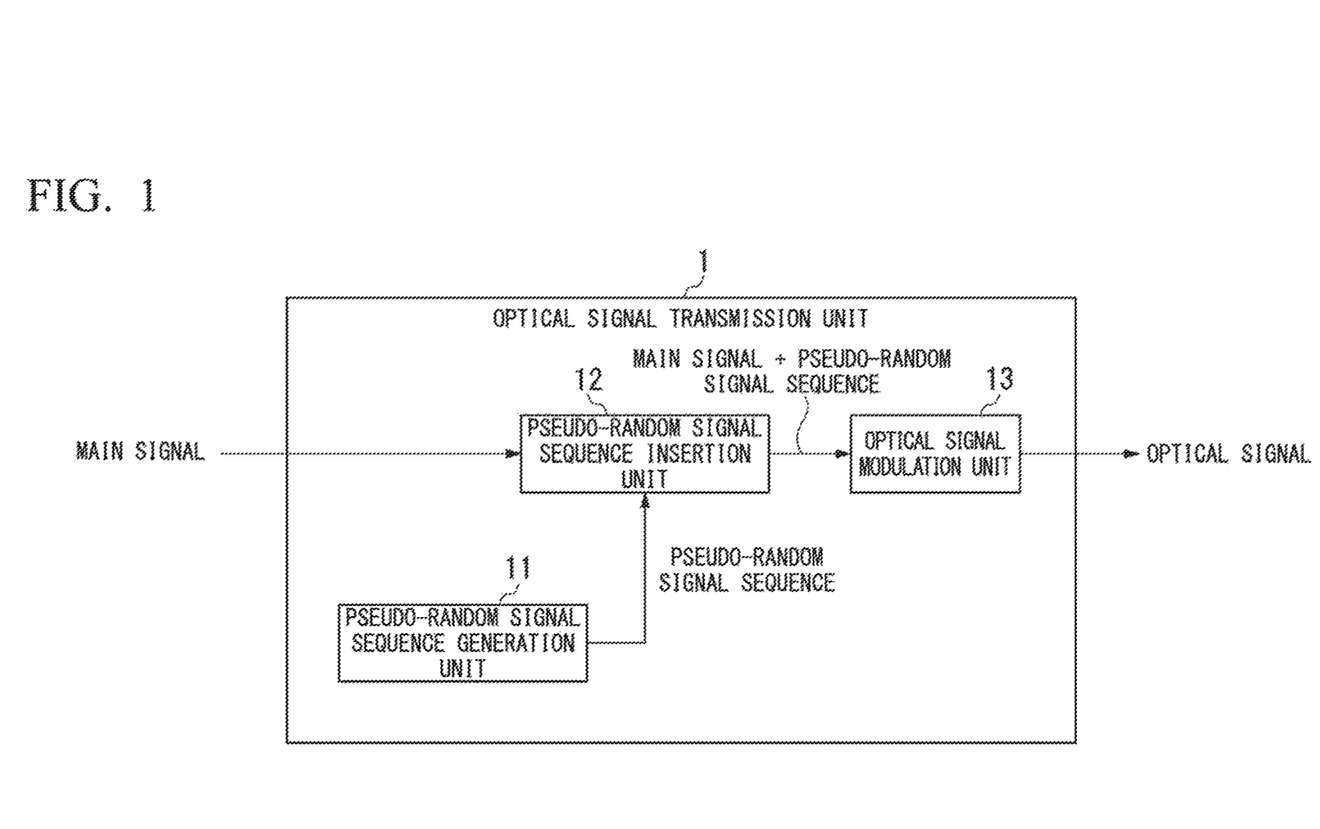
FIG. 1 is a block diagram showing an example of a configuration of an optical signal transmission unit provided in a transmitter in a first embodiment.

FIG. 1 is a block diagram showing an example of a configuration of an optical signal transmission unit 1 provided in the transmitter in the first embodiment. The optical signal transmission unit 1 includes a pseudo-random signal sequence generation unit 11, a pseudo-random signal sequence insertion unit 12, and an optical signal modulation unit 13.

The pseudo-random signal sequence generation unit 11 generates a pseudo-random signal sequence including pseudo-random signals as a sequence of predetermined pattern signals necessary for the receiver to calculate the SNR. Although the pseudo-random signal sequence is a repetitive signal of a pseudo-random number sequence obtained by deterministic calculation, the pseudo-random signal sequence has a sufficiently long repetition period and is regarded to be substantially irregular. The pseudo-random signal sequence generation unit 11 outputs the generated pseudo-random signal sequence to the pseudo-random signal sequence insertion unit 12.

The pseudo-random signal sequence insertion unit 12 inserts the pseudo-random signal sequence generated by the pseudo-random signal sequence generation unit 11 into an input main signal. The pseudo-random signal sequence insertion unit 12 outputs the main signal into which the pseudo-random signal sequence is inserted to the optical signal modulation unit 13.

The optical signal modulation unit 13 modulates the main signal into which the pseudo-random signal sequence has been inserted by the pseudo-random signal sequence insertion unit 12 into an optical signal. The modulated main signal is output to an optical fiber which is a transmission path and transmitted to the receiver.

Figure 2:
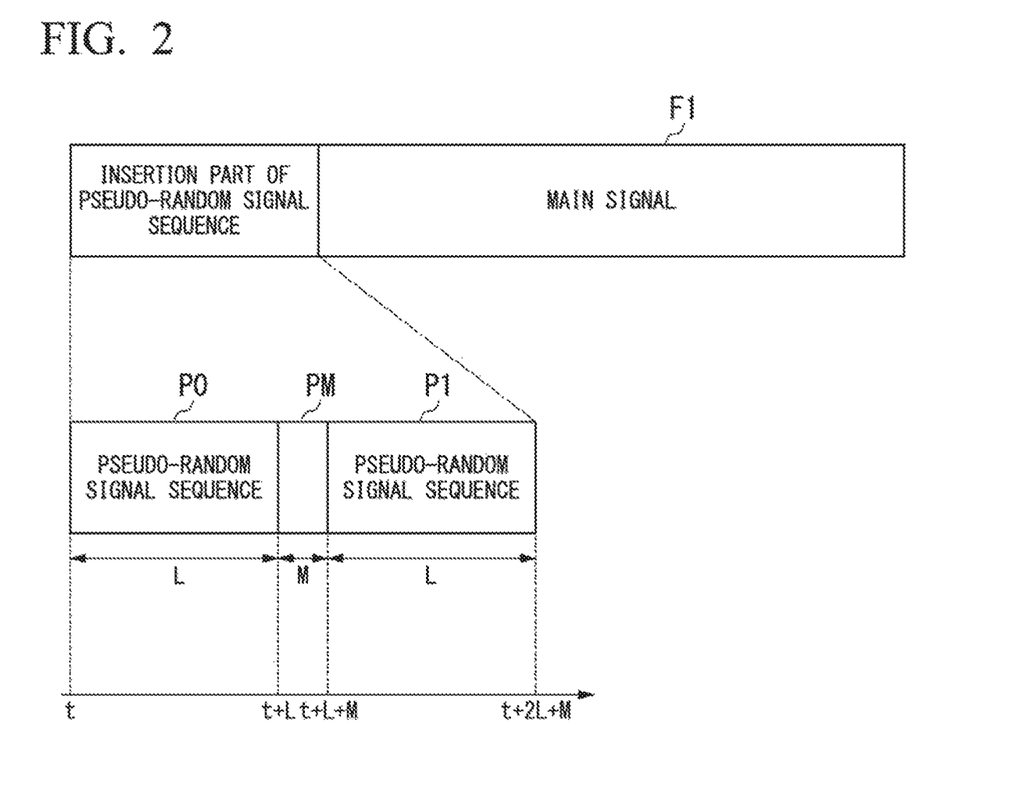
FIG. 2 is a diagram showing a specific example of an insertion position of a pseudo-random signal in the first embodiment.

FIG. 2 is a diagram showing a specific example of positions where a pair of pseudo-random signal sequences are inserted into a main signal. For example, the pseudo-random signal sequence insertion unit 12 inserts two or more pseudo-random signal sequences into any parts of a transmission frame. FIG. 2 shows an example in which two pseudo-random signal sequences P0 and P1 are inserted in order from a beginning part of a transmission frame F1. One or more pairs of pseudo-random signal sequences are inserted into the main signal. The first pseudo-random signal sequence P0 may be the same signal sequence as the next pseudo-random signal sequence P1 or may be a signal sequence represented by signals obtained by inverting signs of signals of the pseudo-random signal sequence P1. The sign inversion means the inversion of the signs of a real part and an imaginary part when each signal of the signal sequence is represented by a complex number.

The length of the pseudo-random signal sequence is arbitrary. The longer the pseudo-random signal sequence is, the higher the estimation accuracy of SNR is. On the other hand, the main signal to be transmitted is reduced by a length of insertion of the pseudo-random signal sequence. Therefore, the length of the pseudo-random signal sequence may be adjusted to an appropriate length according to the estimation accuracy of SNR to be required.

The pseudo-random signal sequence P0 and the pseudo-random signal sequence P1 do not need to be necessarily continuous, and an intermediate pattern PM shown in FIG. 2 may be inserted between P0 and P1. It is possible to insert any signal sequence as the intermediate pattern between P0 and P1. Increasing a distance between the pseudo-random signal sequence P0 and the pseudo-random signal sequence P1, a possibility that a difference in the state of the transmission path when each signal sequence is transmitted will occur increases. Therefore, it is preferable that the pseudo-random signal sequence P0 and the pseudo-random signal sequence P1 be inserted close to each other. A sequence of predetermined pattern signals generated by the pseudo-random signal sequence generation unit 11 is not limited to a pseudo-random signal sequence and may be a sequence of pattern signals in which a simple repetitive signal such as "0101 . . . " or the same pattern such as "1111 . . . " is consecutive. When the pseudo-random signal sequence is inserted into the main signal, it is possible to limit the occurrence of a bias to a specific frequency component in the optical signal and it is possible to suppress the occurrence of a nonlinear optical effect. It is desirable that the pseudo-random signal sequence inserted into the main signal is not biased to a specific frequency component.

The optical signal modulation unit 13 generates, for example, a QPSK, 8-QAM, or 16-QAM signal, in accordance with an output of the pseudo-random signal sequence insertion unit 12. However, the signal format is not limited thereto. For example, in QPSK, 4 symbol points of (1, 1), (1, −1), (−1, 1) and (−1, −1) can be selected on a constellation map. That is, the pseudo-random signal sequence functions as a pattern signal for randomly selecting any one of the 4 symbol points. Likewise, in 16-QAM, it is possible to select any one of 16 symbol points and a pseudo-random signal sequence functions as a pattern for randomly selecting any one of the 16 symbol points.

Figure 3:
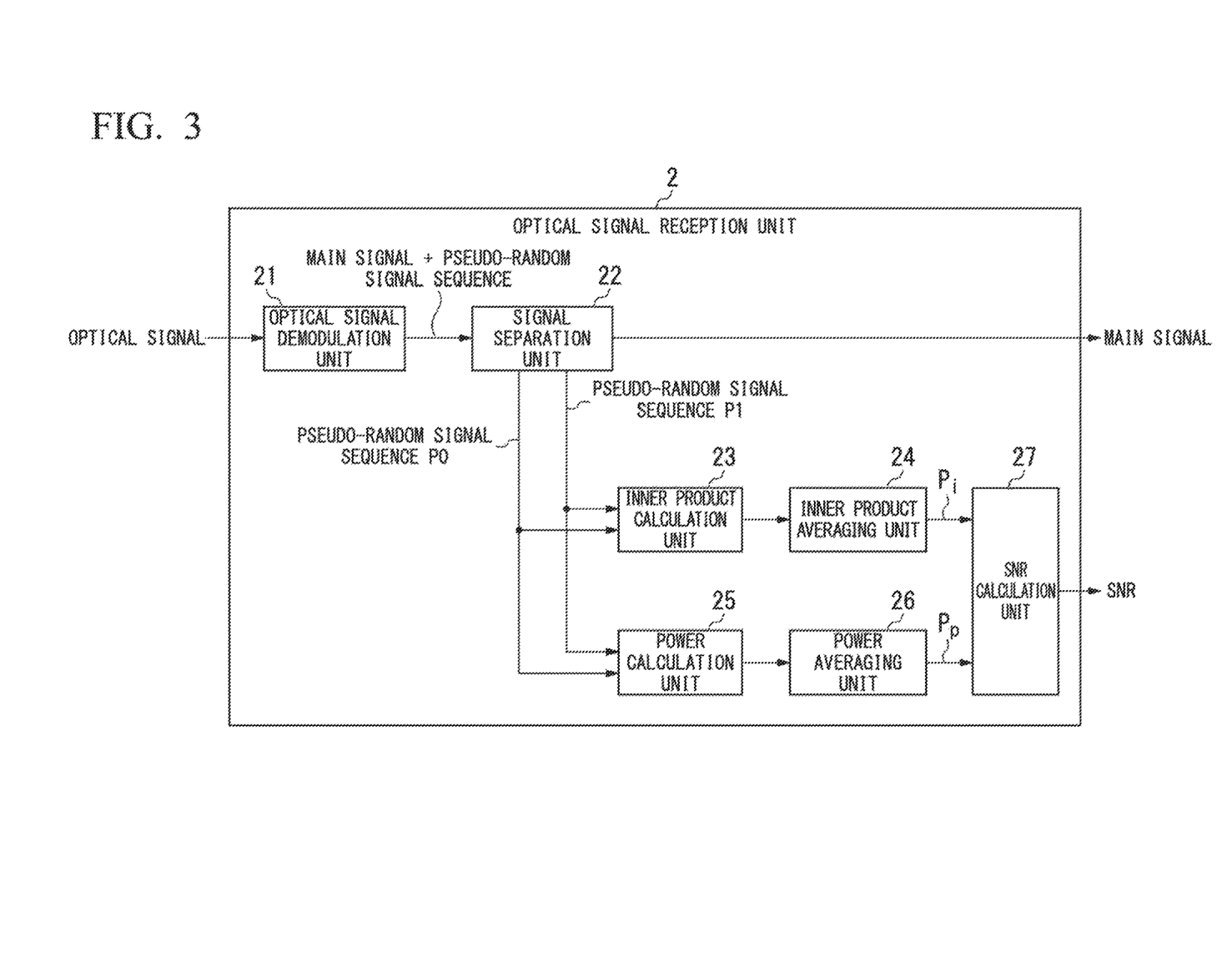
FIG. 3 is a block diagram showing an example of a configuration of an optical signal reception unit provided in a receiver in the first embodiment.

FIG. 3 is a block diagram showing an example of a configuration of the optical signal reception unit 2 provided in the receiver in the first embodiment. The optical signal reception unit 2 includes an optical signal demodulation unit 21, a signal separation unit 22, an inner product calculation unit 23, an inner product averaging unit 24, a power calculation unit 25, and a power averaging unit 26.

The optical signal demodulation unit 21 receives an optical signal transmitted from the transmitter, and demodulates the received optical signal into an electrical signal. Hereinafter, the electrical signal generated by demodulating the optical signal is referred to as a received signal. The optical signal demodulation unit 21 outputs the received signal generated by demodulating the optical signal to the signal separation unit 22.

The signal separation unit 22 separates the received signal after demodulation by the optical signal demodulation unit 21 into a partial signal corresponding to the main signal and another partial signal corresponding to the pseudo-random signal sequence. Specifically, the signal separation unit 22 identifies the pseudo-random signal sequence included in the received signal in a matching process on the received signal and the pseudo-random signal sequence inserted by a transmitter side and extracts a partial signal corresponding to the identified pseudo-random signal sequence from the received signal. Hereinafter, the partial signal corresponding to the pseudo-random signal sequence is simply referred to as a pseudo-random signal sequence.

The signal separation unit 22 outputs the extracted pseudo-random signal sequence to the inner product calculation unit 23 and the power calculation unit 25. For example, when the receiver received the frame F1 shown in FIG. 2, the signal separation unit 22 extracts pseudo-random signal sequences P0 and P1 from the frame F1 and outputs the extracted pseudo-random signal sequences P0 and P1 to the inner product calculation unit 23 and the power calculation unit 25. Also, the pseudo-random signal sequence inserted by the transmitter side required in the matching process is stored in advance in a storage unit such as a memory provided in the receiver or an auxiliary storage device, so that the transmitter and the receiver may use the same pseudo-random signal sequence. Alternatively, the transmitter side and the receiver side include a program and hardware for generating the same pseudo-random signal sequence and therefore the transmitter and the receiver may use the same pseudo-random signal sequence.

The signal separation unit 22 outputs the received signal from which the pseudo-random signal sequence has been extracted as the main signal.

The inner product calculation unit 23 calculates an inner product of pseudo-random signal sequences extracted by the signal separation unit 22. For example, when the pair of pseudo-random signal sequences P0 and P1 have been extracted, the inner product calculation unit 23 calculates the inner product of the pair of pseudo-random signal sequences according to the following Eq. (1).

[Math. 1]

$$P_i = \sum_{x=t}^{t+L} P_0(x) * P_1(x+L+M)^* \quad (1)$$

In Eq. (1), the term "$P_0(x)$" denotes a complex signal of the pseudo-random signal sequence P0 at time x and the term "$P_1(x)*$" denotes a complex conjugate of a complex signal of the pseudo-random signal sequence P1 at time x. Here, time x denotes a time at which each signal constituting the pseudo-random signal sequence was received. The term "t" denotes a time when a beginning signal of the first pseudo-random signal sequence P0 was received. The term "L" denotes a signal length of the pseudo-random signal sequence P0 and the pseudo-random signal sequence P1, and the term "M" denotes a signal length of an intermediate pattern. That is, $P_i$ is a value obtained by summing inner products of signals included in the pair of pseudo-random signal sequences. Here, because noise components have no correlation, they cancel each other out. Only a signal component of the pseudo-random signal sequence is included in an inner product value. The inner product calculation unit 23 outputs the inner product value of the pair of pseudo-random signal sequences calculated as described above to the inner product averaging unit 24. When a plurality of pairs of pseudo-random signal sequences are extracted from the main signal, the inner product calculation unit 23 calculates an inner product value for each pair of pseudo-random signal sequences and outputs the calculated inner product values to the inner product averaging unit 24.

The inner product averaging unit 24 acquires a plurality of inner product values calculated by the inner product calculation unit 23 and calculates an average value of the plurality of acquired inner product values. The plurality of inner product values may be acquired on the basis of a pseudo-random signal sequence included in one received signal or may be acquired on the basis of pseudo-random signal sequences included in a plurality of received signals. The inner product averaging unit 24 outputs the calculated average value of the inner product values as a signal component of the received pseudo-random signal sequence to the SNR calculation unit 27.

The power calculation unit 25 calculates reception power of each pseudo-random signal sequence extracted by the signal separation unit 22. For example, when the pair of pseudo-random signal sequences P0 and P1 have been extracted, the power calculation unit 25 calculates reception power of the pair of pseudo-random signal sequences according to the following Eq. (2).

[Math. 2]

$$P_p = \sum_{x=t}^{t+L} |P_0(x)|^2 + \sum_{x=t+L+M}^{t+2L+M} |P_1(x)|^2 \quad (2)$$

Eq. (2) indicates that a power value $P_p$ of the pseudo-random signal sequence is obtained by summing squares of absolute values of complex signals $P_0(x)$ of the pseudo-random signal sequence P0 received from time t to time t+L and squares of absolute values of complex signals $P_1(x)$ of the pseudo-random signal sequence P1 received from time t+L+M to time t+2L+M. The power calculation unit 25 outputs the calculated power value $P_p$ as the reception power of the received pseudo-random signal sequences to the power averaging unit 26. When a plurality of pairs of pseudo-random signal sequences are extracted from the main signal, the power calculation unit 25 calculates the power value $P_p$ for each pair of pseudo-random signal sequences and outputs the calculated power values $P_p$ to the power averaging unit 26

The power averaging unit 26 acquires a plurality of power values calculated by the power calculation unit 25 and calculates an average value of the plurality of acquired power values. A plurality of reception power values may be acquired on the basis of a pseudo-random signal sequence included in one received signal or may be acquired on the basis of pseudo-random signal sequences included in a plurality of received signals. The power averaging unit 26 outputs the calculated average value of the power values as the power value of the received signal to the SNR calculation unit 27.

The SNR calculation unit 27 calculates the SNR on the basis of the signal component of the pseudo-random signal sequence calculated by the inner product averaging unit 24 and the reception power of the pseudo-random signal sequence calculated by the power averaging unit 26. In general, the SNR is calculated by the following Eq. (3).

[Math. 3]

$$SNR = \frac{P_s}{P_n} \quad (3)$$

In Eq. (3), the term "$P_s$" denotes power of the signal component of the received signal and the term "$P_n$" denotes power of the noise component of the received signal. In this case, the reception power $P_s$ of the signal component and the reception power $P_n$ of the noise component can be represented as shown in Eq. (4) and Eq. (5) using an average value $P_i$ of the inner product values and an average value $P_p$ of the reception power obtained above.

[Math. 4]

$$P_i = P_s \quad (4)$$

[Math. 5]

$$P_p = P_s + P_n \quad (5)$$

The SNR calculation unit 27 can calculate the SNR in the following Eq. (6) using the average inner product value $P_i$ and the average reception power value $P_p$.

[Math. 6]

$$SNR = \frac{P_i}{P_p - P_i} \quad (6)$$

In the optical transmission system of the first embodiment configured as described above, the transmitter has a configuration to generate a pair of pseudo-random signal sequences including pseudo-random signals as a sequence of predetermined pattern signals necessary for measuring the SNR and embed the generated pair of pseudo-random signal sequences in a transmission signal. As the transmitter has such a configuration, it is possible to measure the SNR while preventing a predetermined pattern signal from being biased to a specific frequency component.

Conventionally, the SNR estimation is performed on the basis of the received signal in which a specific frequency component is emphasized by embedding an alternating pattern or the like. By contrast, in the optical transmission system of the first embodiment, the reception side can detect a signal component and a noise component included in the received signal by taking an inner product of received pseudo-random signal sequences. As the transmission side inserts the pair of pseudo-random signal sequences into any part of the main signal and transmits the main signal, the optical transmission system can estimate the SNR accurately without emphasizing a specific frequency component.

Furthermore, the optical transmission system of the first embodiment has a configuration in which the receiver calculates average values of a plurality of observed values as the signal component and the reception power of a pseudo-random pattern. As the system has such a configuration, the system can estimate the SNR accurately even when a short pseudo-random signal sequence is used as a predetermined pattern signal. Also, the receiver may be configured without including the inner product averaging unit 24 and the power averaging unit 26 in accordance with the signal length of the pseudo-random signal sequence. That is, the SNR calculation unit 27 may calculate the SNR on the basis of the inner product value calculated by the inner product calculation unit 23 and the reception power calculated by the power calculation unit 25. Because it is possible to regard calculating the inner product value from the pair of pseudo-random signal sequences as averaging the signal components, the SNR estimated from the pair of pseudo-random signal sequences also has certain accuracy.

Second Embodiment

While the optical transmission system in the first embodiment has a configuration in which the SNR is estimated with respect to a single polarized wave, an optical transmission system in a second embodiment has a configuration in which SNRs are estimated with respect to an X-polarized wave and a Y-polarized wave, respectively.

Figure 4:
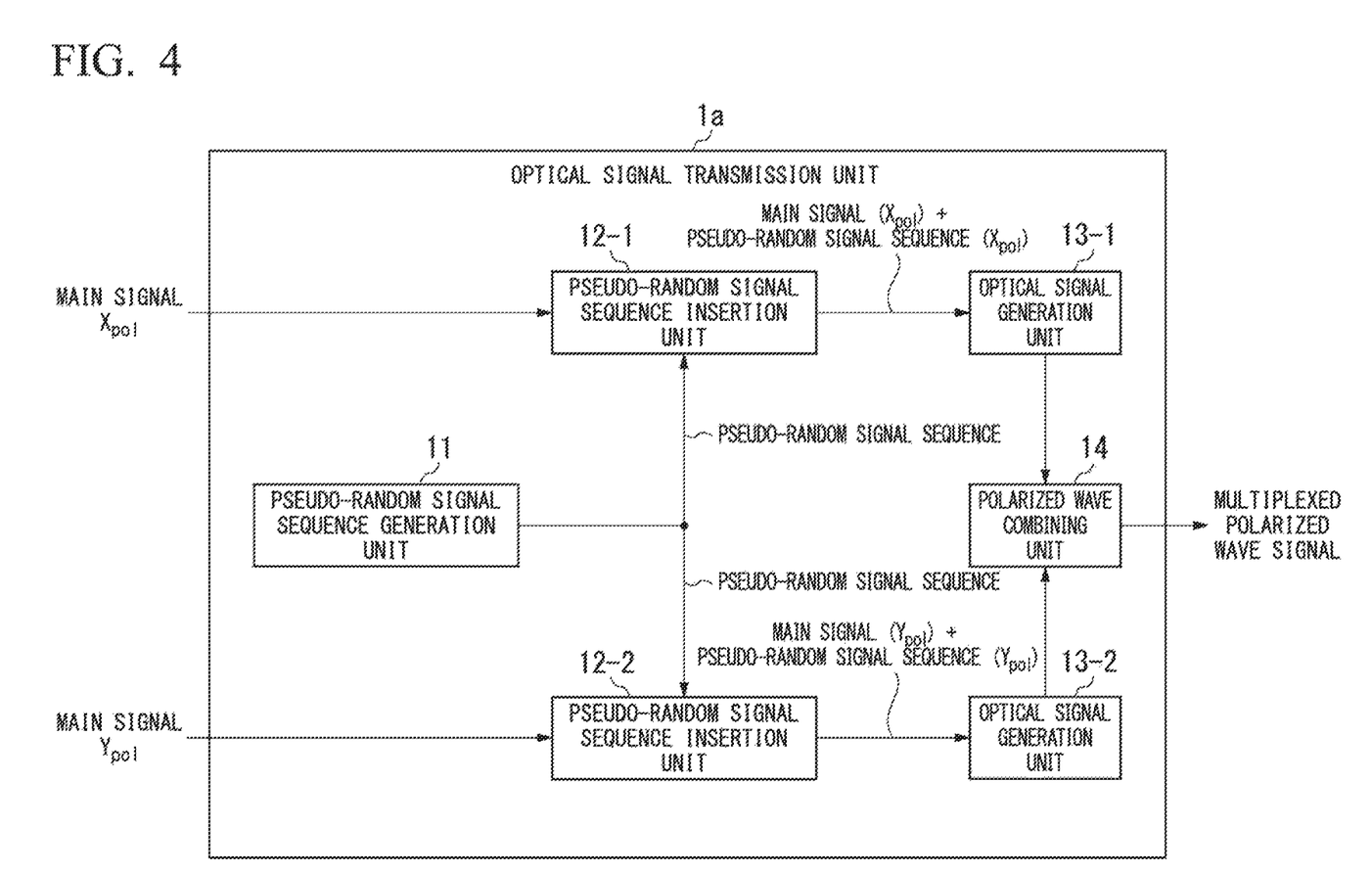
FIG. 4 is a block diagram showing an example of a configuration of an optical signal transmission unit provided in a transmitter in a second embodiment.

FIG. 4 is a block diagram showing an example of a configuration of an optical signal transmission unit 1a provided in a transmitter in the optical transmission system of the second embodiment. The optical signal transmission unit 1a is different from the optical signal transmission unit 1 in the first embodiment in that the pseudo-random signal sequence insertion unit 12 and the optical signal modulation unit 13 are provided for each of the X- and Y-polarized waves and that a polarized wave combining unit 14 configured to combine and output optical signals modulated for the X- and Y-polarized waves is further provided. Specifically, the optical signal transmission unit 1a includes a pseudo-random signal sequence insertion unit 12-1 and an optical signal modulation unit 13-1 for processing the X-polarized wave and a pseudo-random signal sequence insertion unit 12-2 and an optical signal modulation unit 13-2 for processing the Y-polarized wave.

The pseudo-random signal sequence insertion unit 12-1 inputs a main signal $X_{pol}$ of the X-polarized wave. The pseudo-random signal sequence insertion unit 12-2 inputs a main signal $Y_{pol}$ of the Y-polarized wave. A pseudo-random signal sequence generated by a pseudo-random signal sequence generation unit 11 is output to both the pseudo-random signal sequence insertion units 12-1 and 12-2. The pseudo-random signal sequence insertion unit 12-1 inserts the pseudo-random signal sequence into the main signal $X_{pol}$ of the X-polarized wave. The optical signal modulation unit 13-1 modulates the main signal $X_{pol}$ of the X-polarized wave into which the pseudo-random signal sequence is inserted into an optical signal and outputs the optical signal. The pseudo-random signal sequence insertion unit 12-2 inserts the pseudo-random signal sequence into the main signal $Y_{pol}$ of the Y-polarized wave. The optical signal modulation unit 13-2 modulates the main signal $Y_{pol}$ of the Y-polarized wave into which the pseudo-random signal sequence is inserted into an optical signal and outputs the optical signal.

The pseudo-random signal sequence generation unit it in the second embodiment may generate different pseudo-random signal sequences for the pseudo-random signal sequence insertion unit 12-1 that is an X-polarized wave processing system and the pseudo-random signal sequence insertion unit 12-2 that is a Y-polarized wave processing system. Also, the pseudo-random signal sequence generation unit 11 can select the same pseudo-random signal sequence or different pseudo-random signal sequences as sequences supplied to the pseudo-random signal sequence insertion units 12-1 and 12-2. This selection may be implemented by a software means based on rewriting of setting information for determining the operation of the pseudo-random signal sequence generation unit 11 or the like or may be implemented by a hardware means based on switching of a switch or the like.

The polarized wave combining unit 14 combines the optical signal of the X-polarized wave output from the optical signal modulation unit 13-1 and the optical signal of the Y-polarized wave output from the optical signal modulation unit 13-2 to form a multiplexed polarized wave signal. The formed multiplexed polarized wave signal is output to a transmission path and transmitted to the receiver.

Figure 5:
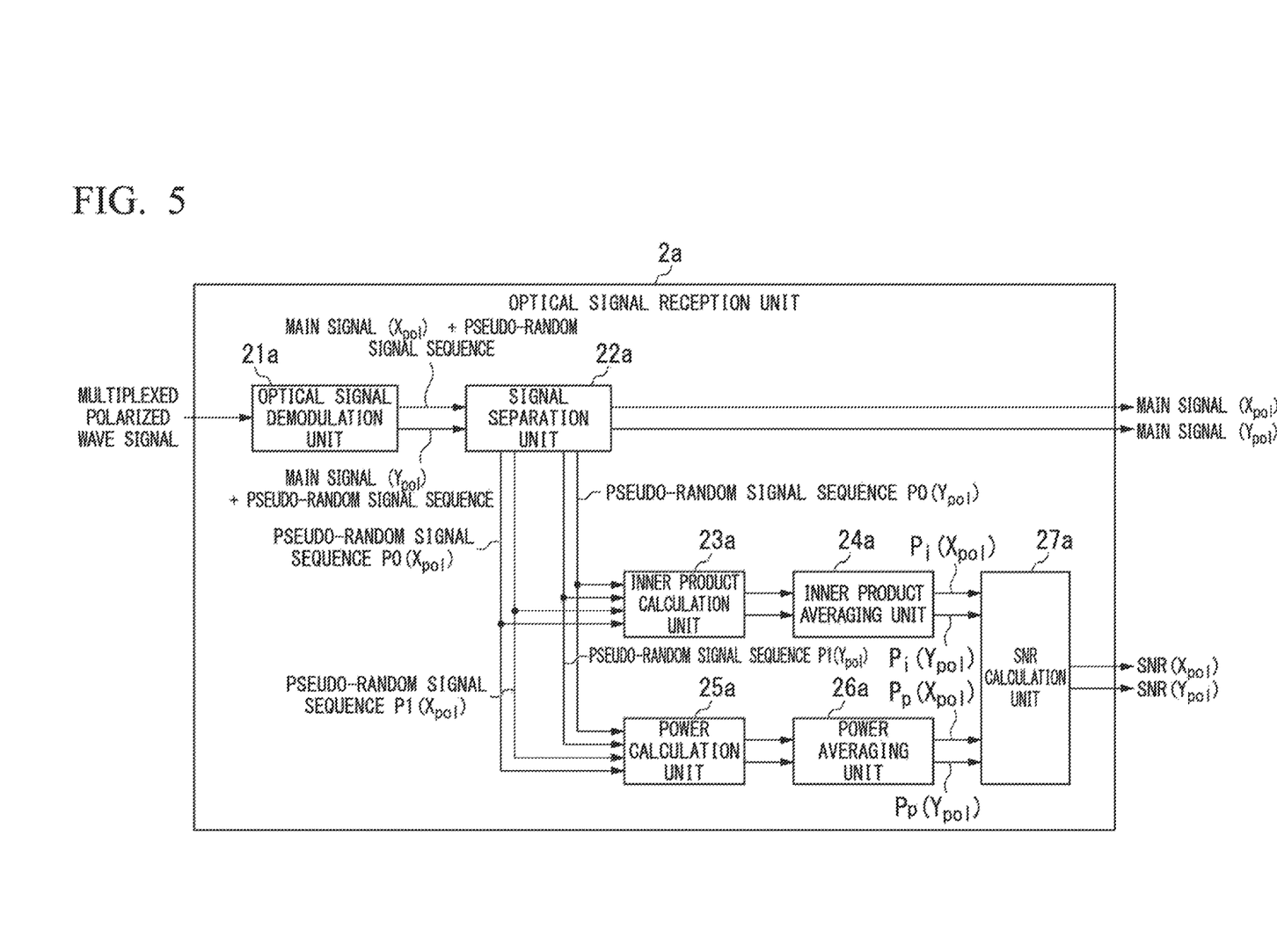
FIG. 5 is a block diagram showing an example of a configuration of an optical signal reception unit provided in a receiver in the second embodiment.

FIG. 5 is a block diagram showing an example of a configuration of an optical signal reception unit 2a provided in a receiver in the second embodiment. The optical signal reception unit 2a includes an optical signal demodulation unit 21a, a signal separation unit 22a, an inner product calculation unit 23a, an inner product averaging unit 24a, a power calculation unit 25a, a power averaging unit 26a, and an SNR calculation unit 27a.

The optical signal demodulation unit 21a separates a received multiplexed polarized wave signal into optical signals of an X-polarized wave component and a Y-polarized wave component and converts the separated optical signal for each of the X-polarized wave component and the Y-polarized wave component into an electrical signal. The optical signal demodulation unit 21a may be configured using a general coherent optical receiver and a digital signal processing circuit. The optical signal demodulation unit 21a outputs a received signal of the X-polarized wave component and a received signal of the Y-polarized wave component obtained by demodulation to the signal separation unit 22a.

The signal separation unit 22a, the inner product calculation unit 23a, the inner product averaging unit 24a, the power calculation unit 25a, the power averaging unit 26a, and the SNR calculation unit 27a perform processes similar to those of the first embodiment with respect to the received signals of the X-polarized wave and the Y-polarized wave separated by the optical signal demodulation unit 21a. As a result, a main signal of each of the X-polarized wave and the Y-polarized wave is output from the signal separation unit 22a and an SNR for each of the X-polarized wave and the Y-polarized wave is calculated in the SNR calculation unit 27a.

In the optical transmission system of the second embodiment configured as described above, when an optical signal is transmitted in a polarized wave multiplexing scheme, the optical signal reception unit 2a can measure SNRs while preventing a predetermined pattern signal for each of the X-polarized wave and the Y-polarized wave from being biased to a specific frequency component.

Third Embodiment

Figure 6:
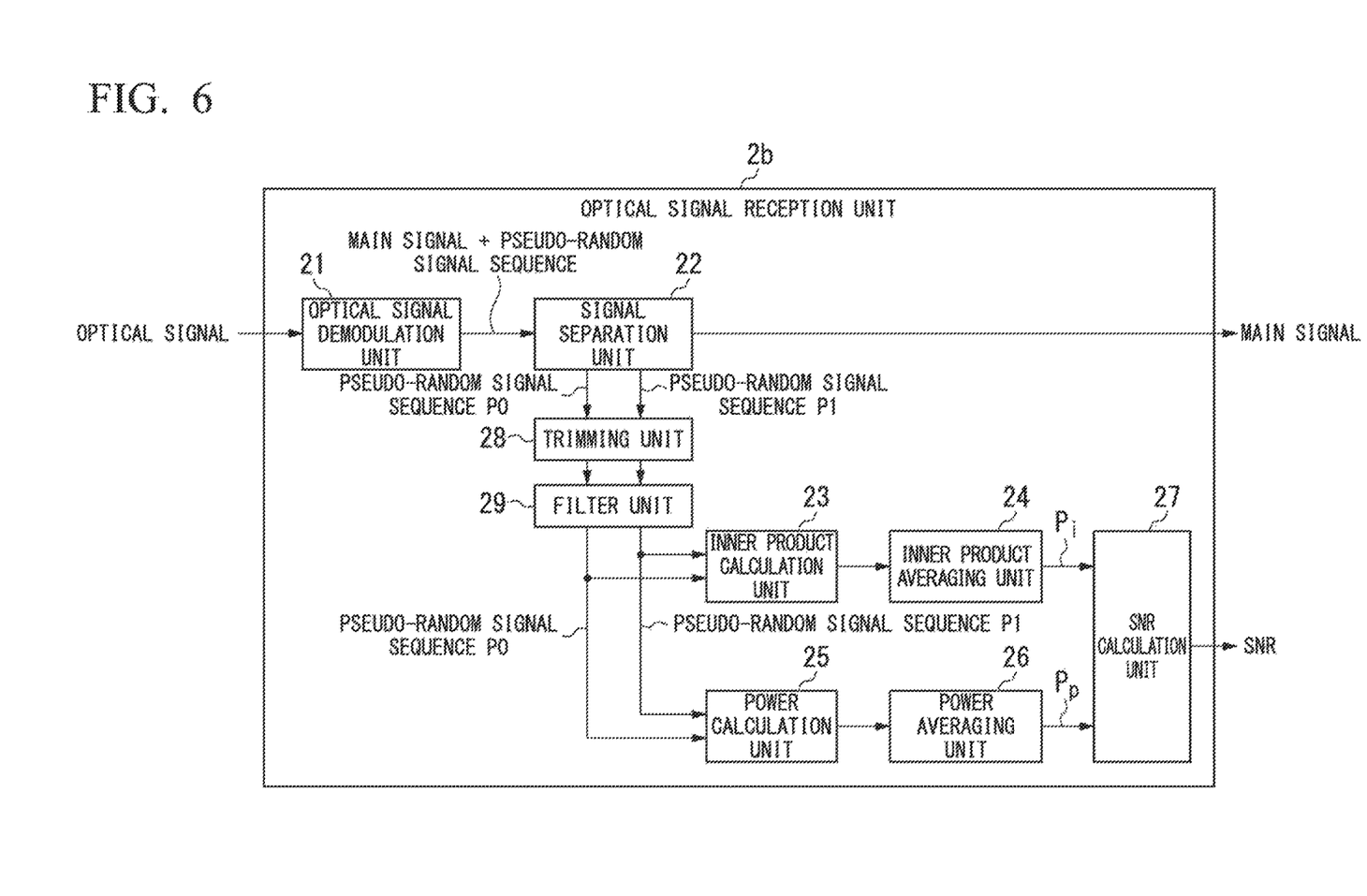
FIG. 6 is a block diagram showing an example of a configuration of an optical signal reception unit provided in a receiver in a third embodiment.

FIG. 6 is a block diagram showing an example of a configuration of an optical signal reception unit 2b provided in a receiver in a third embodiment. The optical signal reception unit 2b is different front the optical signal reception unit 2 in the first embodiment in that the optical signal reception unit 2b further includes a trimming unit 28 and a filter unit 29. Because the other functional units in the optical signal reception unit 2b are similar to those of the optical signal reception unit 2 in the first embodiment, the similar functional units are denoted by the same reference signs as those of FIG. 3 and therefore description of the similar functional units will be omitted. An optical signal transmission unit in the third embodiment has the same configuration as that of the optical signal transmission unit 1 in the first embodiment.

The trimming unit 28 executes a process of removing a partial signal from an input signal (hereinafter: referred to as a "trimming process"). Specifically, the trimming unit 28 performs the trimming process on each pseudo-random signal sequence output from a signal separation unit 22. The trimming unit 28 removes a partial signal that may cause the accuracy of estimation of the SNR to be degraded from each pseudo-random signal sequence in the trimming process. The trimming unit 28 outputs each pseudo-random signal sequence from which the partial signal has been removed after the trimming process to the filter unit 29.

The filter unit 29 executes a process of removing a partial frequency component signal from the input signal (hereinafter referred to as a "filtering process"). Specifically, the filter unit 29 performs the filtering process on each pseudo-random signal sequence after the trimming process output from the trimming unit 28. The filter unit 29 removes a partial frequency component that may cause the accuracy of estimation of the SNR to be degraded from each pseudo-random signal sequence in the filtering process. The filter unit 29 outputs each pseudo-random signal sequence from which the partial frequency component has been removed after the filtering process to an inner product calculation unit 23 and a power calculation unit 25.

Figure 7:
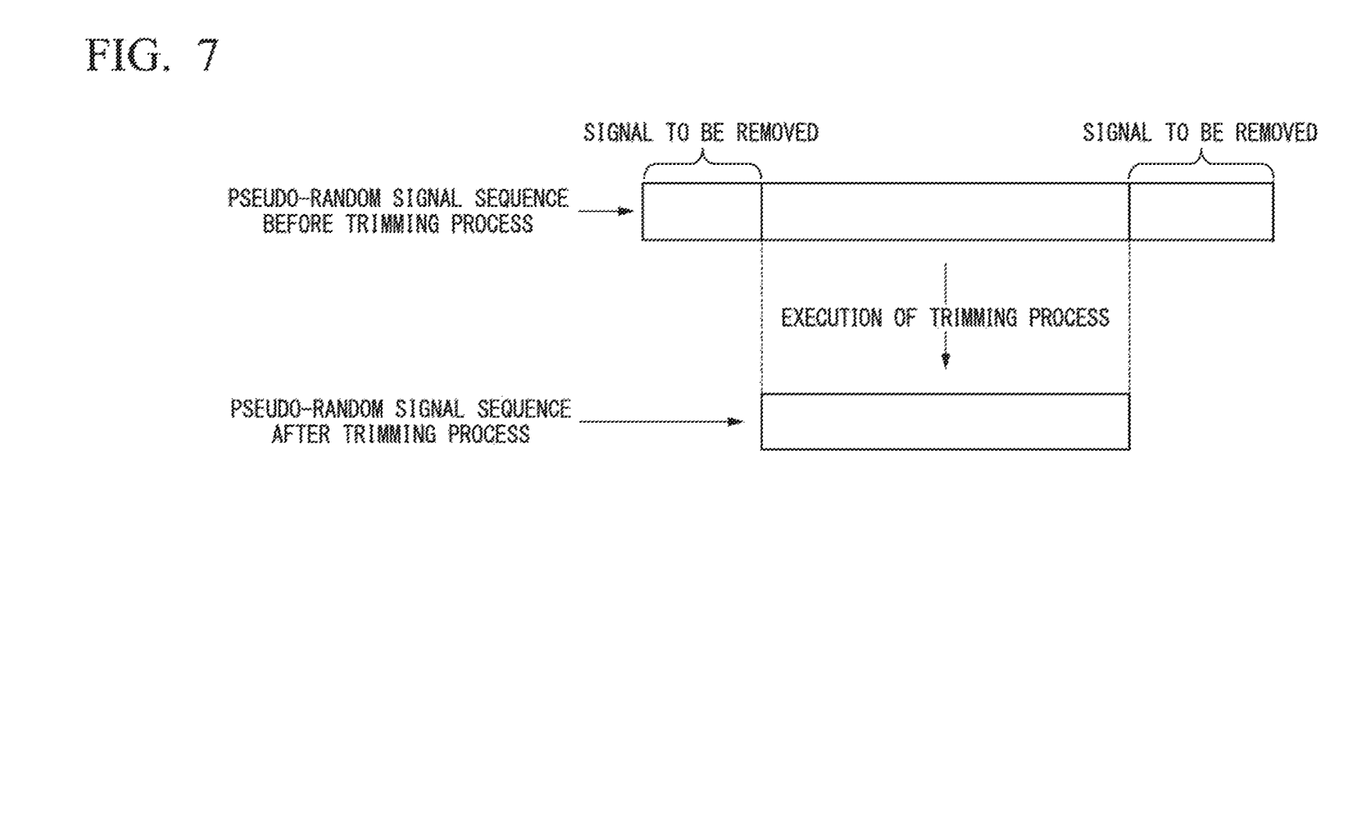
FIG. 7 is a diagram showing a specific example of a trimming process in the third embodiment.

FIG. 7 shows a specific example of the trimming process. FIG. 7 shows an example of the trimming process of removing partial signals at both ends of a pseudo-random signal sequence. In general, in optical transmission, signals may interfere with each other due to an influence of wavelength dispersion and polarized wave mode dispersion occurring during transmission and the reception accuracy may be degraded. Such degradation in reception accuracy is considered to be likely to occur at a boundary between adjacent signals. When the trimming unit 28 removes a partial signal of a certain length from both ends of the pseudo-random signal sequence, the SNR calculation unit 27 can perform SNR estimation with high accuracy. Specifically the trimming unit 28 removes partial signals by replacing a signal sequence having a predetermined length at both ends of the pseudo-random signal sequence with a sequence of zeros. A length of a partial signal removed from both ends of the pseudo-random signal sequence is not limited to the predetermined length and may be appropriately set in accordance with a state of the transmission path and the like.

Figure 8:
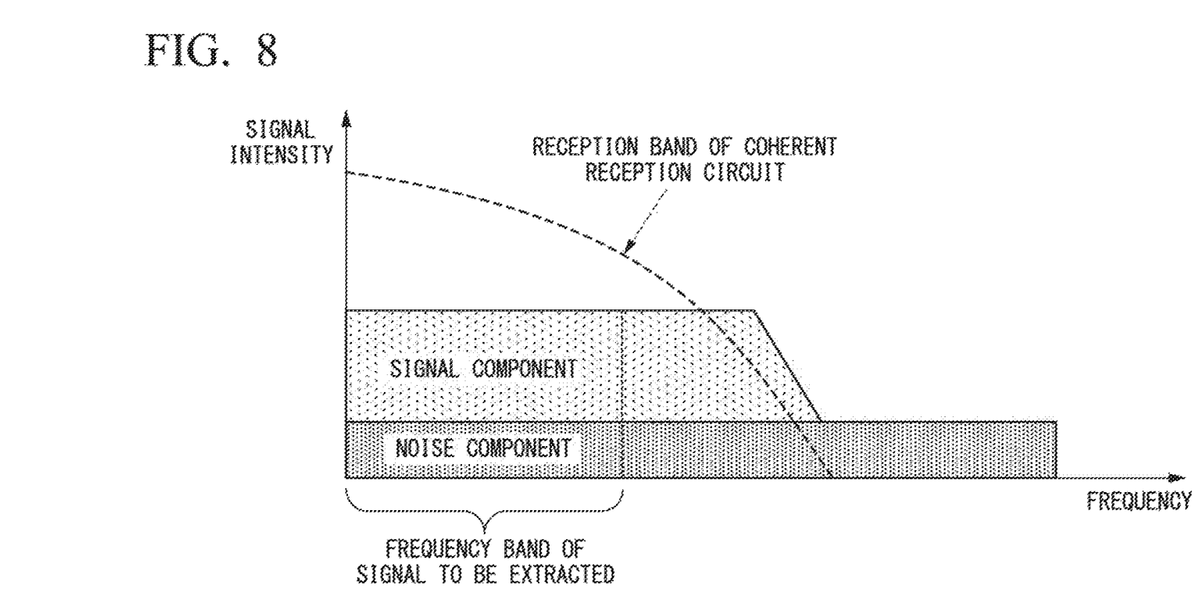
FIG. 8 is a diagram showing a specific example of a filtering process in the third embodiment.

FIG. 8 is a diagram showing a specific example of the filtering process. In general, a coherent reception circuit has a certain frequency band as an operation band thereof. As shown in FIG. 8, some signal and noise components in the received signal are cut. A ratio between the signal components and the noise components to be cut differs in accordance with the operation band of the coherent reception circuit. Thus, there is a possibility that the estimated SNR will deviate from the correct value in accordance with an operation band (hereinafter referred to as a "reception band") of the coherent receiving circuit. In order to limit such degradation in the estimation accuracy of the SNR, the filter unit 29 extracts a signal of a frequency band that is not affected by the reception band from the pseudo-random signal sequence by executing the filtering process.

Figure 9:
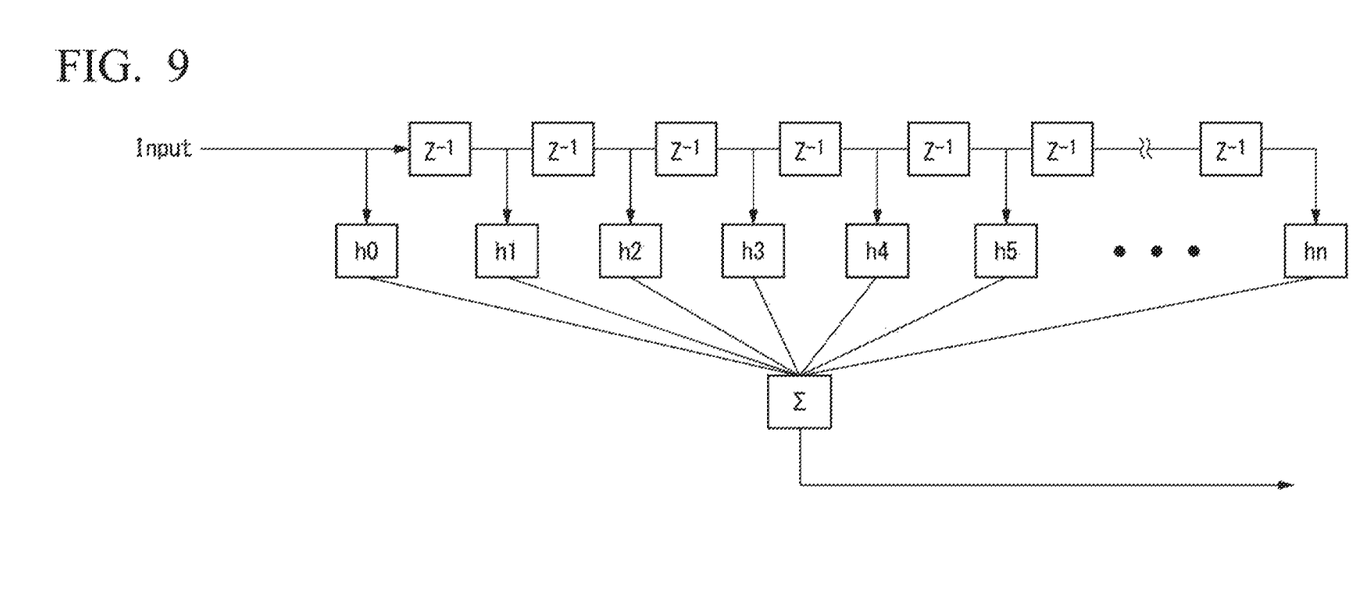
FIG. 9 is a diagram showing an example of a configuration of a filter unit in the third embodiment.

FIG. 9 is a view showing an example of a configuration of the filter unit 29. As shown in FIG. 9, the filter unit 29 may be implemented by digital signal processing using a general finite impulse response (FIR) filter. Filter coefficients h0, h1, . . . , hn are determined in accordance with the reception hand. The filter unit 29 is not limited to the FIR filter and may be configured using an infinite impulse response (IIR) filter or an external analog filter.

In the optical transmission system of the third embodiment configured as described above, the receiver includes the trimming unit 28 and the filter unit 29 for removing a partial signal that may cause the accuracy of SNR estimation to be degraded with respect to each received pseudo-random signal sequence, thereby more accurately estimating an SNR.

Modified Examples

In the third embodiment, the optical signal reception unit 2b may include either one of the trimming unit 28 and the filter unit 29. Also, one or both of the trimming unit 28 and the filter unit 29 described in the third embodiment may be included in the optical signal reception unit 2a in the second embodiment.

Some or all of the optical signal transmission units 1 and 1a and the optical signal reception units 2, 2a, and 2b in the embodiments described above may be implemented by a computer. In this case, the transmitter and the receiver may include a central processing unit (CPU), a memory, an auxiliary storage device, and the like connected by a bus and the CPU may execute instructions in a program stored in the memory or the auxiliary storage device. The CPU provided in the transmitter may operate as the optical signal transmission unit by executing instructions in the program. The CPU provided in the receiver may operate as the optical signal reception unit by executing instructions in the program.

Further, this function may be implemented by recording the program for implementing the function on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a storage device including a flexible disk, a magneto-optical disc, a read only memory (ROM), a portable medium such as a compact disc (CD)-ROM, and a hard disk embedded in the computer system. Further, the "computer-readable recording medium" may include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. The above-described program may be used to implement some of the above-described functions. Further, the program may implement the above-described functions in combination with a program already recorded on the computer system.

A part or all of the optical signal transmission unit and the optical signal reception unit may be implemented as an electronic circuit using a programmable logic device such as an application specific integrated circuit (ASIC), a programmable logic device (PLD), or a field programmable gate arrays (FPGA).

Although the embodiments of the present invention have been described above in detail with reference to the drawings, specific configurations are not limited to the embodiments and other designs and the like may also be included within the scope of the present invention.

INDUSTRIAL APPLICABILITY

The present invention can be applied to optical transmission system.

REFERENCE SIGNS LIST 1, 1a Optical signal transmission unit
11 Pseudo-random signal sequence generation unit
12, 12-1, 12-2 Pseudo-random signal sequence insertion unit
13, 13-1, 13-2 Optical signal modulation unit
14 Polarized wave combining unit
2, 2a. 2b Optical signal reception unit
21, 21a Optical signal demodulation unit
22, 22a Signal separation unit
23, 23a Inner product calculation unit
24, 24a Inner product averaging unit
25, 25a Power calculation unit
26, 26a Power averaging unit
27, 27a Signal to noise ratio (SNR) calculation unit
28 Trimming unit
29 Filter unit

The invention claimed is:

1. A signal-to-noise ratio (SNR) estimation method comprising:
an optical signal transmission step of inserting at least one pair of signal sequences into transmission data and transmitting the transmission data into which the at least one pair of signal sequences is inserted;
a signal sequence extraction step of extracting the at least one pair of signal sequences from a received signal obtained by receiving the transmitted transmission data;
an inner product calculation step of calculating an inner product value of the extracted at least one pair of signal sequences;
a reception power calculation step of calculating reception power of the extracted at least one pair of signal sequences; and an SNR calculation step of calculating an SNR of the at least one pair of signal sequences by dividing the calculated inner product value by a difference between the calculated inner product value and the calculated reception power.

2. The SNR estimation method according to claim 1, wherein the optical signal transmission step includes:
  inserting the at least one pair of signal sequences into the transmission data of each of an X-polarized wave and a Y-polarized wave,
  combining the transmission data of the X-polarized wave into which the at least one pair of signals is inserted and the transmission data of the Y-polarized wave into which the at least one pair of signals is inserted, and
  transmitting the combined transmission data of the X-polarized wave with the transmission data of the Y-polarized wave,
wherein the signal sequence extraction step includes:
  receiving the combined transmission data of the X-polarized wave with the transmission data of the Y-polarized wave in the optical signal transmission step, and
  extracting the at least one pair of signal sequences from each of the received signal of the X-polarized wave and the received signal of the Y-polarized wave,
wherein the inner product calculation step includes:
  calculating an inner product value of the at least one pair of signal sequences extracted from the received signal of the X-polarized wave, and
  calculating an inner product value of the at least one pair of signal sequences extracted from the received signal of the Y-polarized wave,
wherein the reception power calculation step includes:
  calculating reception power of the at least one pair of signal sequences extracted from the received signal of the X-polarized wave, and
  calculating reception power of the at least one pair of signal sequences extracted from the received signal of the Y-polarized wave, and
wherein the SNR calculation step includes:
  calculating the SNR of the at least one pair of signal sequences of the X-polarized wave on a basis of the calculated inner product value and reception power of the X-polarized wave, and
  calculating the SNR of the at least one pair of signal sequences of the Y-polarized wave on a basis of the calculated inner product value and reception power of the Y-polarized wave.

3. The SNR estimation method according to claim 1, further comprising a trimming step of removing a signal of a predetermined length from both ends of each of the at least one pair of signal sequences extracted in the signal sequence extraction step,
  wherein the inner product calculation step includes calculating the inner product value of the at least one pair of signal sequences from which the signal of the predetermined length has been removed in the trimming step, and
  wherein the reception power calculation step includes calculating the reception power of the at least one pair of signal sequences from which the signal of the predetermined length has been removed in the trimming step.

4. The SNR estimation method according to claim 3, further comprising a filtering step of extracting a signal component of a frequency band that is not affected by a reception band of a coherent reception circuit for receiving the transmission data from the at least one pair of signal sequences from which the signal of the predetermined length has been removed in the trimming step,
  wherein the inner product calculation step includes calculating the inner product value of signal components of the at least one pair of signal sequences extracted in the filtering step, and
  wherein the reception power calculation step includes calculating the reception power of the signal components of the at least one pair of signal sequences extracted in the filtering step.

5. The SNR estimation method according to claim 1, further comprising:
  an inner product value averaging step of calculating an average value of inner product values calculated for each at least one pair of signal sequences extracted in the signal sequence extraction step; and
  a reception power averaging step of calculating an average value of reception power calculated for each at least one pair of signal sequences extracted in the signal sequence extraction step,
  wherein the SNR calculation step includes calculating the SNR of the at least one pair of signal sequences on a basis of the average value of the inner product values calculated in the inner product value averaging step and the average value of the reception power calculated in the reception power averaging step.

6. The SNR estimation method according to claim 1, wherein the at least one pair of signal sequences include a pair of a pseudo-random signal sequence and one signal sequence of the pseudo-random signal sequence and a signal sequence obtained by inverting signs of signals of the pseudo-random signal sequence.

7. An optical transmission apparatus comprising:
  a signal sequence extractor configured to extract at least one pair of signal sequences from a received signal including transmission data and the at least one pair of signal sequences;
  an inner product calculator configured to calculate an inner product value of the at least one pair of signal sequences extracted by the signal sequence extractor;
  a power calculator configured to calculate reception power of the at least one pair of signal sequences extracted by the signal sequence extractor; and
  an SNR calculator configured to calculate an SNR of the at least one pair of signal sequences by dividing the inner product value calculated by the inner product calculator by a difference between the inner product value calculated by the inner product calculator and the reception power calculated by the power calculator.

8. An optical transmission system comprising:
  an optical signal transmitter configured to insert at least one pair of signal sequences into transmission data and transmit the transmission data into which the at least one pair of signal sequences is inserted;
  a signal sequence extractor configured to extract the at least one pair of signal sequences from a received signal obtained by receiving the transmitted transmission data;
  an inner product calculator configured to calculate an inner product value of the at least one pair of signal sequences extracted by the signal sequence extractor;
  a power calculator configured to calculate reception power of the at least one pair of signal sequences extracted by the signal sequence extractor; and
  an SNR calculator configured to calculate an SNR of the at least one pair of signal sequences by dividing the inner product value calculated by the inner product calculator by a difference between the inner product value calculated by the inner product calculator and the reception power calculated by the power calculator.

9. An optical transmission apparatus comprising:
a signal sequence extraction circuit that extracts at least one pair of signal sequences from a received signal including transmission data and the at least one pair of signal sequences;
an inner product calculation circuit that calculates an inner product value of the at least one pair of signal sequences extracted by the signal sequence extraction circuit;
a power calculation circuit that calculates reception power of the at least one pair of signal sequences extracted by the signal sequence extraction circuit; and
an SNR calculation circuit that calculates an SNR of the at least one pair of signal sequences by dividing the inner product value calculated by the inner product calculation circuit by a difference between the inner product value calculated by the inner product calculation circuit and the reception power calculated by the power calculation circuit.

10. An optical transmission system comprising:
an optical signal transmission circuit that inserts at least one pair of signal sequences into transmission data and transmits the transmission data into which the at least one pair of signal sequences is inserted;
a signal sequence extraction circuit that extracts the at least one pair of signal sequences from a received signal obtained by receiving the transmitted transmission data;
an inner product calculation circuit that calculates an inner product value of the at least one pair of signal sequences extracted by the signal sequence extraction circuit;
a power calculation circuit that calculates reception power of the at least one pair of signal sequences extracted by the signal sequence extraction circuit; and
an SNR calculation circuit that calculates an SNR of the at least one pair of signal sequences by dividing the inner product value calculated by the inner product calculation circuit by a difference between the inner product value calculated by the inner product calculation circuit and the reception power calculated by the power calculation circuit.

\* \* \* \* \*